R. L. SMITH.
TEST INDICATOR.
APPLICATION FILED FEB. 17, 1906.

943,282.

Patented Dec. 14, 1909.

Witnesses
L. Armstrong
Wm. J. Dolan

Inventor
Ralph L. Smith
By J. H. Freeman
Attorney

UNITED STATES PATENT OFFICE.

RALPH L. SMITH, OF ORANGE, NEW JERSEY.

TEST-INDICATOR.

943,282.   Specification of Letters Patent.   Patented Dec. 14, 1909.

Application filed February 17, 1906. Serial No. 301,594.

*To all whom it may concern:*

Be it known that I, RALPH L. SMITH, a citizen of the United States, and a resident of Orange, Essex county, State of New Jersey, have invented certain new and useful Improvements in Test-Indicators, of which the following is a specification.

This invention relates to a test indicator or gage particularly adapted for the use of machinists and toolmakers for detecting and measuring the inaccuracies and relative variations of surfaces or the eccentricity of the setting of lathe work and the like.

An object of the invention is to provide a construction of the character referred to which is simple, compact and self-contained and at the same time extremely sensitive and accurate.

Other objects of the invention are to provide a construction which may be applied to either side of a piece of work and which is otherwise universal in its application; also to provide means whereby the device may be conveniently adapted to supports of various kinds and sizes.

These and various objects of the invention will more fully appear from the following description.

The invention consists in the novel parts, improvements and combinations herein shown and described.

The accompanying drawings, which are referred to herein and form a part hereof, illustrate one embodiment of the invention and serve in connection with the description herein to explain the principles thereof.

Figure 1:
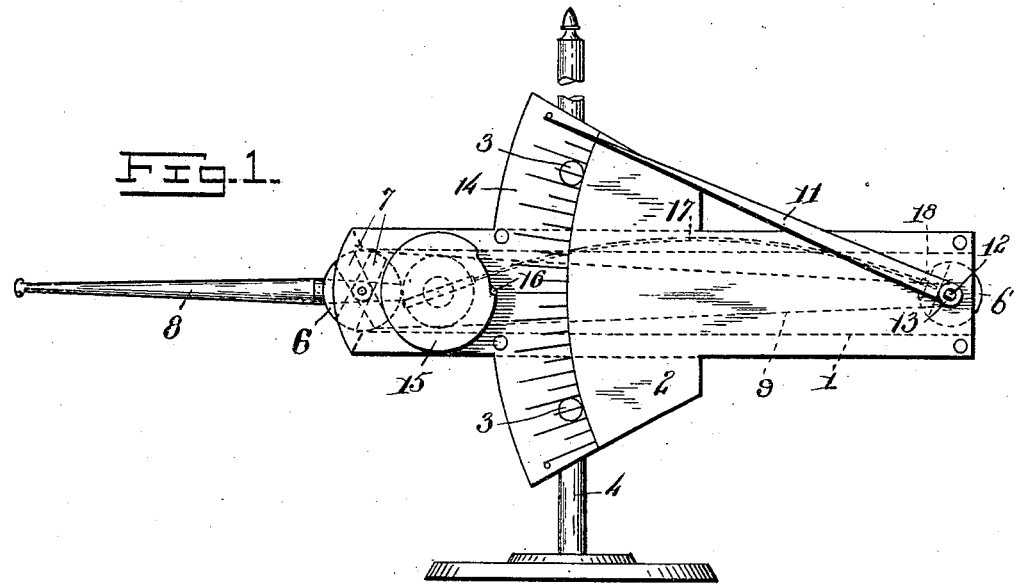
Figure 2:
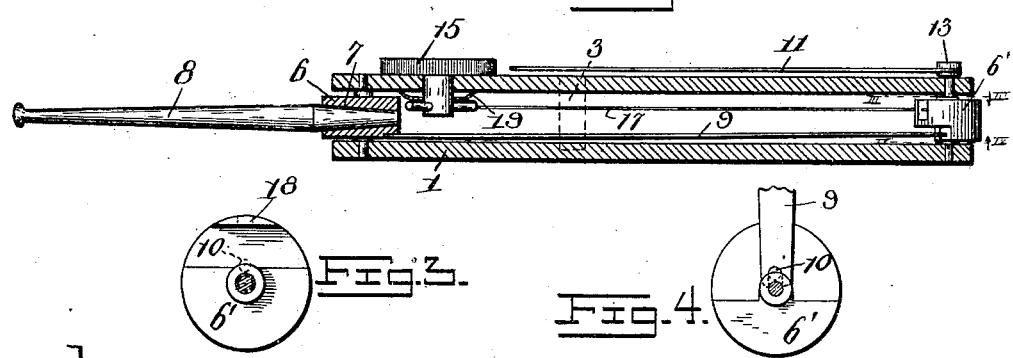
Figure 3:
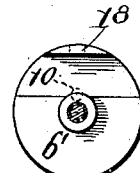
Figure 4:
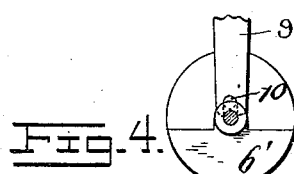
Figure 5:
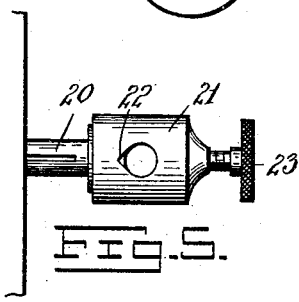
Figure 6:
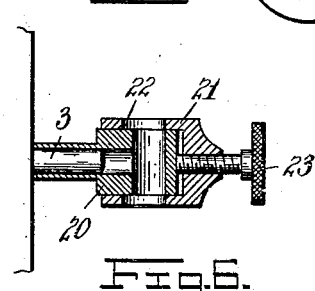
Figure 7:
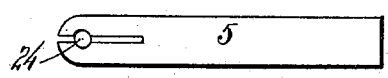

Of the drawings, Figure 1 is an elevation of the indicator as attached to an ordinary surface-gage base; Fig. 2 is a longitudinal section, showing parts in elevation; Fig. 3 is a view of the needle-arbor taken on the line III—III of Fig. 2, looking downward; Fig. 4 is a view of the same arbor taken on the line IV—IV, Fig. 2, looking upward, and showing a portion of the first multiplying lever; Fig. 5 is a side elevation and Fig. 6 a longitudinal section of a clamp adapted to secure the indicator to a gage-base; and Fig. 7 is an elevation, on a reduced scale, of a holder for the indicator adapted to be secured in the tool-post of a lathe.

In accordance with the particular embodiment of my invention illustrated, the device comprises a frame having a body portion 1 of channel section upon which is suitably secured a cover-plate 2, provided with lateral extensions adapted to receive a graduated scale and having studs 3, 3, either of which may be connected by a clamp to the standard 4 of a surface-gage base, or which may be inserted in the split end of a bar 5, adapted to be held in a tool post.

It will be observed that the studs 3, 3 do not project beyond the plane of the rear surface of the body portion 1, thereby permitting the device to lie flat or be clamped firmly on its rear surface without interference by the sides.

In the forward end of the frame is rotatably mounted a turret-shaped member 6 provided with a plurality of radial sockets 7, preferably tapered, and adapted to receive "feelers" 8, of different lengths, if desired, in any one of several positions, for convenience in using the indicator.

Suitably attached to the member 6, as by brazing or sweating, is the first lever 9 of the multiplying mechanism, which lever is bifurcated at its opposite end and passes astride of a pin 10, eccentrically mounted in the body of the needle-arbor 6', as shown in Figs. 2 and 4.

To the reduced end of the arbor which passes through the plate 2, is suitably secured the second lever or needle-lever 11, of the multiplying mechanism, as by passing its correspondingly apertured end over the oppositely-flattened sides of the arbor end and securing it by a nut 13. The needle-lever is thus directed again toward the front end of the indicator and its forward end is free to move over the scale 14.

To adapt the indicator for use in detecting either inside or outside eccentricity without reversal of the entire instrument, and also for convenience in testing either the upper or lower plane surface of a piece of work, I provide needle reversing or deflecting mechanism consisting of a knurled thumb-piece 15 having an arc of its periphery recessed and adapted to be stopped in either of its extreme positions by a pin 16 located in the axis of the cover-plate 2. Passed transversely through the inner end of the journal of the thumb-piece, and suitably secured therein, is a spring member 17, the opposite end of which passes through an orifice 18 in the periphery of the needle-arbor, as shown in Figs. 1 and 3. Member 15 and spring 17 are held in any position in which they may be set by means of a spring washer 19, surrounding the journal of the thumb-piece and secured thereon by the insertion of the spring holder.

For readily securing the indicator to the standard of a surface-gage, I provide a clamp comprising the members 20 and 21 and the thumb-screw 23. This clamp is shown in Figs. 5 and 6, one of the studs 3 being in the position as viewed from the right in Fig. 1, the clamp being in position to engage the vertical post 4 of the surface gage. The clamp-body 20 is provided with a split sleeve-extension adapted to frictionally embrace one of the studs 3 of the indicator sufficiently tightly to support the indicator when in use. The body is provided with a transverse orifice adapted to be brought into alinement with a pair of similar orifices in the sleeve 21, the latter orifices having V-shaped extensions 22, so that the clamp may be securely attached to standards of different sizes by forcing the orifices of the two members out of alinement by the screw 23, after they have been passed over the standard.

When the indicator is to be used in a lathe, one of the studs 3 is thrust into the orifice 24 in the split end of the shank or member 5, and the latter secured in the tool post.

The operation is as follows:—The needle 11 is first swung to either end of the scale that may be necessitated by the position of the piece to be tested, by turning the thumb-piece 16; a "feeler" is inserted in the orifice 7 most convenient for the work, and its end brought lightly against the surface to be tested. It will be readily seen that by computation, the length of the feelers and of the arms of the compound lever may be made such that any untruth of surface or setting can be shown and read in thousandths of an inch, or any other desired divisions, on the scale 14.

Many changes may be made in my device by the skilled mechanic without departing from my invention; since

What I claim is:

1. In a test-indicator, the combination of a scale-carrying member, a compound lever device including a feeler-carrying member and a needle member for multiplying the indications, and a reversible deflecting member including a spring acting directly on said needle member arranged to divert the needle-member to either end of the scale, substantially as described.

2. In a test-indicator, in combination, a scale-carrying frame, a compound-lever device including two lever members for multiplying the indications, suitably mounted on said frame, one of said lever-members constituting the indicator needle, and a reversible deflecting-spring acting directly upon said indicator needle and arranged to move the free end of said needle-member to either end of the scale; substantially as described.

3. In a test-indicator, a supporting frame, a lever having a feeler-holder, said holder having means for supporting said feeler in any one of a plurality of positions, substantially as described.

4. In a test indicator, a compound lever device one member of which includes a holder having means for supporting a feeler in each of a plurality of positions, substantially as described.

5. In a test-indicator, a clamp comprising a member arranged to engage a stud on said indicator, a sleeve longitudinally movable on said member, said sleeve and member being provided with transverse orifices arranged to be brought into alinement to receive a supporting-rod, and means for clamping said sleeve and member upon said rod; substantially as described.

6. In a test-indicator, a clamp comprising a member having a split tubular extension arranged to engage a stud on said indicator, a sleeve longitudinally movable on said member, said sleeve and member having transverse orifices adapted to be brought into alinement and said sleeve orifices having V-shaped extensions at one side thereof, and a screw in said sleeve arranged to relatively move said member and sleeve to secure said clamp upon a support; substantially as described.

7. A test-indicator having a supporting stud, in combination with a clamp constructed to frictionally engage said stud and having means for clamping transversely arranged supports of different sizes; substantially as described.

8. A test-indicator comprising a frame having a body portion and oppositely projecting portions each having means whereby the indicator may be secured in place, said securing means being confined within the space between the planes of the opposite surfaces of the indicator, substantially as described.

9. A test-indicator comprising a frame having a body portion and oppositely projecting portions near one end of the body portion thereby providing an extended surface for a suitable scale, a primary lever pivoted near the end of the frame having the side projections and an indicator lever pivoted near the opposite end of the frame and operatively connected with said primary lever, said indicator lever being adapted to traverse said scale and means whereby the indicator lever may be deflected to either end of the scale, substantially as described.

In testimony whereof, I have signed my name to this specification, in the presence of two subscribing witnesses.

RALPH L. SMITH.

Witnesses:
  MAXWELL LUSTIG,
  WM. J. DOLAN.